(12) United States Patent
Freitas et al.

(10) Patent No.: US 11,436,548 B2
(45) Date of Patent: Sep. 6, 2022

(54) IDENTIFYING WORKERS IN A CROWDSOURCING OR MICROTASKING PLATFORM WHO PERFORM LOW-QUALITY WORK AND/OR ARE REALLY AUTOMATED BOTS

(71) Applicant: DefinedCrowd Corporation, Seattle, WA (US)

(72) Inventors: Joao Freitas, Lisbon (PT); Daniela Braga, Lisbon (PT); Andre Pontes, Lisbon (PT)

(73) Assignee: DefinedCrowd Corporation, Seattle, WA (US)

( * ) Notice: Subject to any disclaimer, the term of this patent is extended or adjusted under 35 U.S.C. 154(b) by 500 days.

(21) Appl. No.: 15/816,612

(22) Filed: Nov. 17, 2017

(65) Prior Publication Data

US 2018/0144283 A1 May 24, 2018

Related U.S. Application Data

(60) Provisional application No. 62/424,175, filed on Nov. 18, 2016.

(51) Int. Cl.
*G06Q 10/06* (2012.01)
*G06N 20/00* (2019.01)
*G06Q 50/00* (2012.01)

(52) U.S. Cl.
CPC ....... *G06Q 10/06398* (2013.01); *G06N 20/00* (2019.01); *G06Q 10/06311* (2013.01); *G06Q 10/06393* (2013.01); *G06Q 10/06395* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 10,445,671 B2* | 10/2019 | Dubey | ................ | G06Q 10/105 |
| 10,467,541 B2* | 11/2019 | Podgorny | ............ | G06F 16/951 |
| 11,074,536 B2* | 7/2021 | Volkov | ............... | G06Q 30/0185 |
| 2007/0250378 A1* | 10/2007 | Hughes | ............ | G06Q 10/06398 |
| | | | | 705/7.42 |
| 2012/0053992 A1* | 3/2012 | Erol | ................... | G06Q 30/0206 |
| | | | | 705/7.35 |
| 2012/0054112 A1* | 3/2012 | Gormish | ................ | G06Q 10/06 |
| | | | | 705/301 |

(Continued)

*Primary Examiner* — Folashade Anderson
(74) *Attorney, Agent, or Firm* — Perkins Coie LLP (57) ABSTRACT

A facility for identifying workers in a crowdsourcing or micro-tasking platform who perform low-quality work and/or are really automated bots is described. To identify users who perform low-quality work and/or are really bots, the facility (1) measures the quality of at least a portion of the work done by each user, and (2) tracks the pattern of behavior performed by each user on the platform—such as which work projects they select, the content of the responses, and the timing of each user interface interaction. The facility uses this information to build and maintain a model, such as a statistical model, that uses the pattern of a user's behavior to predict the level of quality of the user's work. Users for which the model predicts a low level of quality are flagged for manual review, or automatically suspended from working or from receiving payment.

19 Claims, 4 Drawing Sheets

(56) References Cited

U.S. PATENT DOCUMENTS

| | | | |
|---|---|---|---|
| 2012/0240039 A1* | 9/2012 | Walker | G06F 40/47 |
| | | | 715/265 |
| 2012/0265573 A1* | 10/2012 | Van Pelt | G06Q 10/06311 |
| | | | 705/7.14 |
| 2014/0089027 A1* | 3/2014 | Brown | G06Q 10/06311 |
| | | | 705/7.15 |
| 2014/0201126 A1* | 7/2014 | Zadeh | A61B 5/4803 |
| | | | 706/52 |
| 2015/0213392 A1* | 7/2015 | Kittur | G06Q 10/06398 |
| | | | 705/7.42 |
| 2017/0061357 A1* | 3/2017 | Dubey | G06Q 40/12 |
| 2017/0269971 A1* | 9/2017 | Anya | G06Q 10/0633 |
| 2017/0323233 A1* | 11/2017 | Bencke | G06N 20/00 |

* cited by examiner

FIG. 4

IDENTIFYING WORKERS IN A CROWDSOURCING OR MICROTASKING PLATFORM WHO PERFORM LOW-QUALITY WORK AND/OR ARE REALLY AUTOMATED BOTS

CROSS-REFERENCE TO RELATED APPLICATION(S)

This application claims the benefit of U.S. Provisional Patent Application No. 62/424,175 filed on Nov. 18, 2016, entitled IDENTIFYING WORKERS IN A CROWDSOURCING OR MICROTASKING PLATFORM WHO PERFORM LOW-QUALITY WORK AND/OR ARE REALLY AUTOMATED BOTS, which is incorporated herein by reference in its entirety.

BACKGROUND

In a crowdsourcing or micro-tasking platform, workers are paid small amounts of money to perform small pieces of work via the web, typically viewing prompts and providing responses.

DETAILED DESCRIPTION

The inventors have noted that, while platform operators provide value to their customers when their workers perform work at a high level of quality, some human workers do not have the necessary skills to provide high-quality input, or complete the work as quickly as possible with no regard for quality in order to maximize the rate at which they capture revenue. Additionally, some people construct bots to participate in the platform and generate revenue without regard for the level of quality of the work done by the bot.

Accordingly, the inventors have conceived and reduced to practice a software and/or hardware facility for identifying workers in a crowdsourcing or micro-tasking platform who perform low-quality work and/or are really automated bots ("the facility").

In some embodiments, to identify users who perform low-quality work and/or are really bots, the facility (1) measures the quality of at least a portion of the work done by each user, and (2) tracks the pattern of behavior performed by each user on the platform—such as which work projects they select, the content of the responses, and the timing of each user interface interaction. The facility uses this information to build and maintain a model, such as a statistical model, that uses the pattern of a user's behavior to predict the level of quality of the user's work. Users for which the model predicts a low level of quality are flagged for manual review, or automatically suspended from working or from receiving payment.

By performing in some or all of these ways, the facility enables platform operators and/or their customers to receive data with higher level of overall quality, and/or better reward the workers that perform higher-quality work.

Description of Figures

The following description provides certain specific details of the illustrated examples. One skilled in the relevant art will understand, however, that embodiments can be practiced without many of these details. Likewise, one skilled in the relevant art will also understand that the present disclosure can include many other features not described in detail herein. Additionally, some well-known structures or functions may not be shown or described in detail below, to avoid unnecessarily obscuring the relevant descriptions of the various examples.

Figure 1:
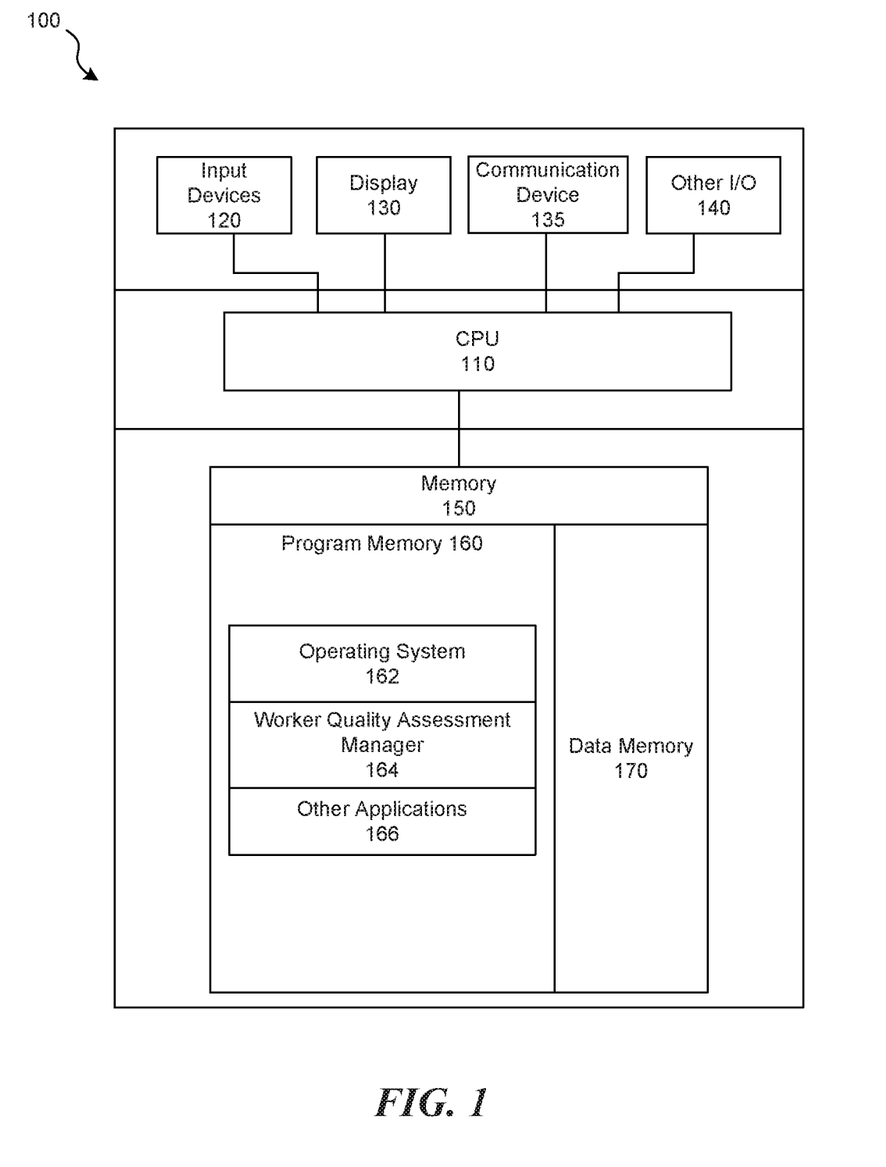
FIG. 1 is a block diagram showing some of the components typically incorporated in computer systems and other devices on which the facility operates.

Several implementations are discussed below in more detail in reference to the figures. Turning now to the figures, FIG. 1 is a block diagram showing some of the components typically incorporated in computer systems and other devices on which the facility operates. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera or image-based input device, a microphone, or other user input devices.

In various embodiments, the CPU 110 is a single processing unit or multiple processing units in a device or distributed across multiple devices. The CPU 110 is coupled to other hardware devices, for example, with the use of a bus, such as a PCI bus or SCSI bus. The CPU 110 communicates with a hardware controller for devices, such as for a display 130. The display 130 is used to display text and graphics. For example, display 130 provides graphical and textual visual feedback to a user. Display 130 can include the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some embodiments, the device 100 includes a communication device 135 capable of communicating with a network node. The communication device communicates with another device or a server through a network using, for example, TCP/IP protocols. The device 100 can utilize the communication device 135 to distribute operations across multiple network devices to send and/or receive data, such as via the Internet or another network and its networking hardware, such as switches, routers, repeaters, electrical cables and optical fibers, light emitters and receivers, radio transmitters and receivers, and the like.

The CPU 110 can have access to a memory 150 in a device or distributed across multiple devices. The memory 150 includes one or more of various hardware devices for volatile and non-volatile storage, and can include both read-only and writable memory. For example, the memory 150 comprises random access memory (RAM), CPU registers, read-only memory (ROM), and writable non-volatile memory, such as flash memory, hard drives, floppy disks, CDs, DVDs, magnetic storage devices, tape drives, device buffers, and so forth. The memory 150 is not a propagating signal divorced from underlying hardware; a memory is thus non-transitory. The memory 150 can include program memory 160 that stores programs and software, such as an operating system 162, worker quality assessment manager 164, and other application programs 166. Memory 150 can also include data memory 170 that includes user data (e.g., user identifiers, user profiles, etc.), task data (e.g., task identifiers, correct result(s), task steps, etc.), user history, user scores, etc., which is provided to the program memory 160 or any element of the device 100.

In various embodiments, the facility operates within numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
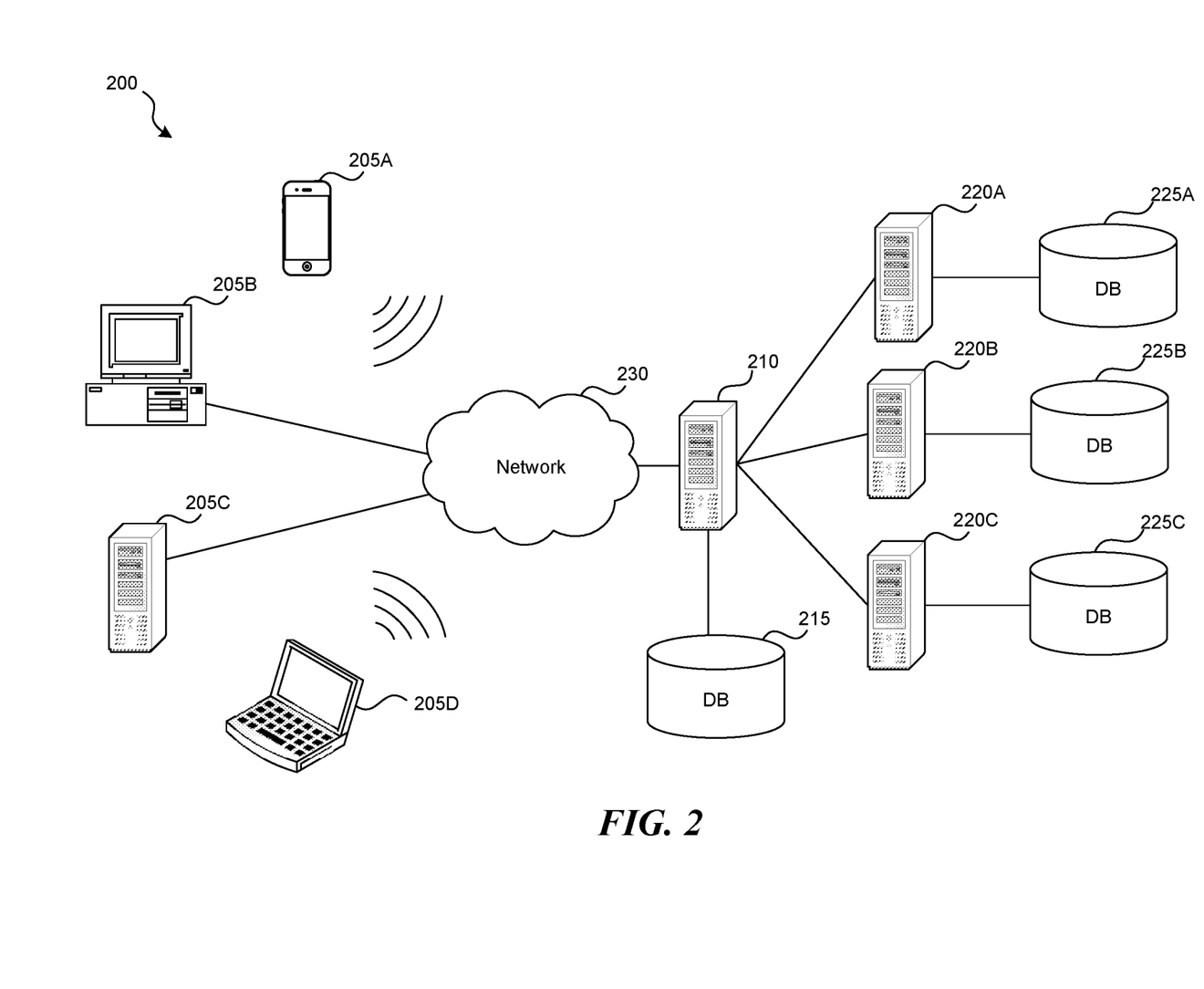
FIG. 2 is a system diagram illustrating an example of a computing environment in which the facility is utilized in some embodiments.

FIG. 2 is a system diagram illustrating an example of a computing environment in which the facility is utilized in some embodiments. In some implementations, environment 200 includes one or more client computing devices 205A-D, examples of which can include device 100. Client computing devices 205 operate in a networked environment using logical connections 210 through network 230 to one or more remote computers, such as a server computing device.

In some implementations, server 210 is an edge server which receives client requests and coordinates fulfillment of those requests through other servers, such as servers 220A-C. In some implementations, server computing devices 210 and 220 comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. In some implementations, servers (210, 220A-C) connect to a corresponding database (215, 225A-C). As discussed above, each server 220 can correspond to a group of servers, and each of these servers can share a database or can have their own database. Databases 215 and 225 warehouse (e.g. store) information such as user data (e.g., user identifiers, user profiles, etc.), task data (e.g., task identifiers, correct result(s), task steps, etc.), user history, user scores, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
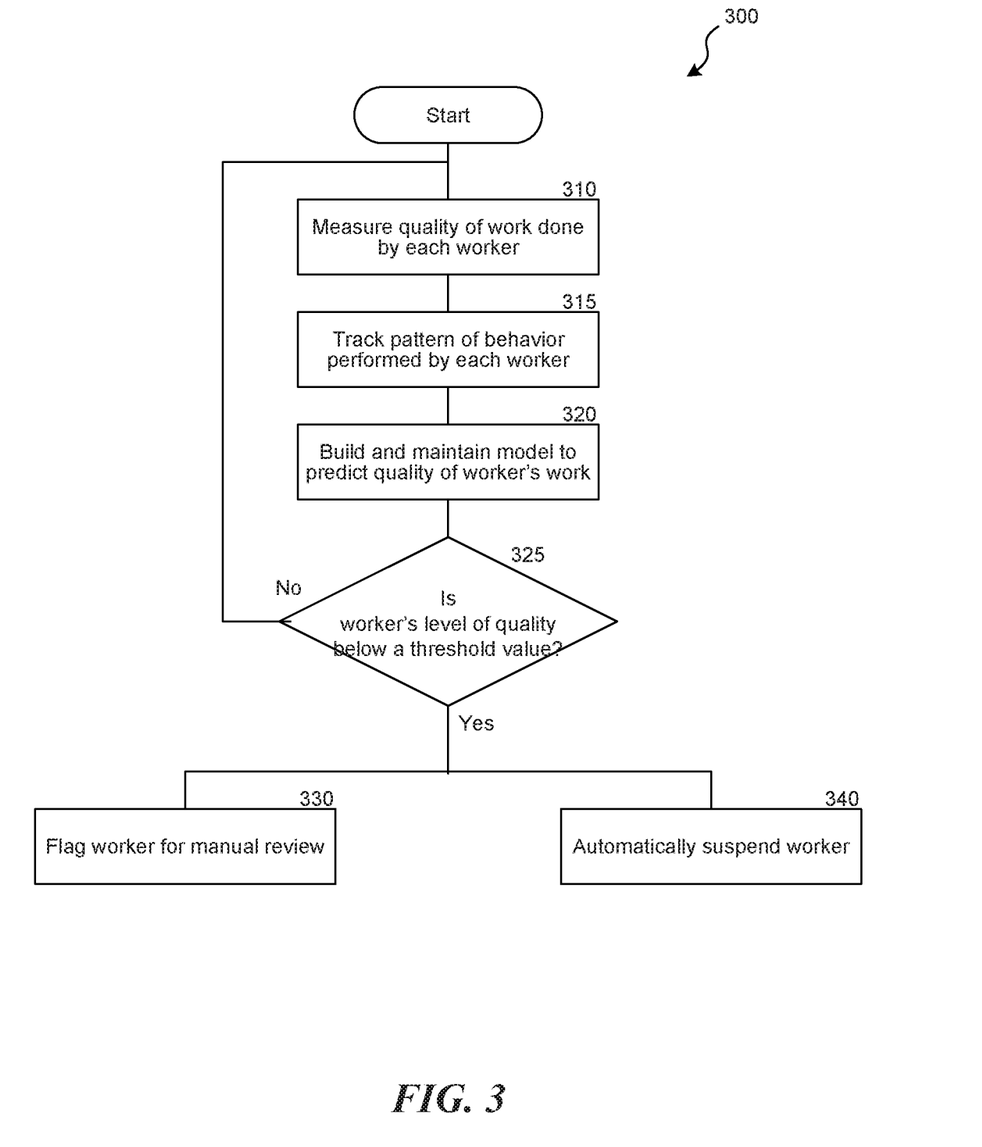
FIG. 3 is a flow diagram showing a process performed by the facility in some embodiments in order to identify workers in a crowdsourcing or micro-tasking platform who perform low-quality work and/or are really automated bots.

FIG. 3 is a flow diagram showing a process 300 performed by the facility in some embodiments in order to identify workers in a crowdsourcing or micro-tasking platform who perform low-quality work and/or are really automated bots. In act 310, the facility uses various combinations of techniques to measure quality of work performed by certain users for one or more jobs. A job may comprise of several tasks. For example, a job may be completing a questionnaire and each question in the questionnaire represents an associated task.

Figure 4:
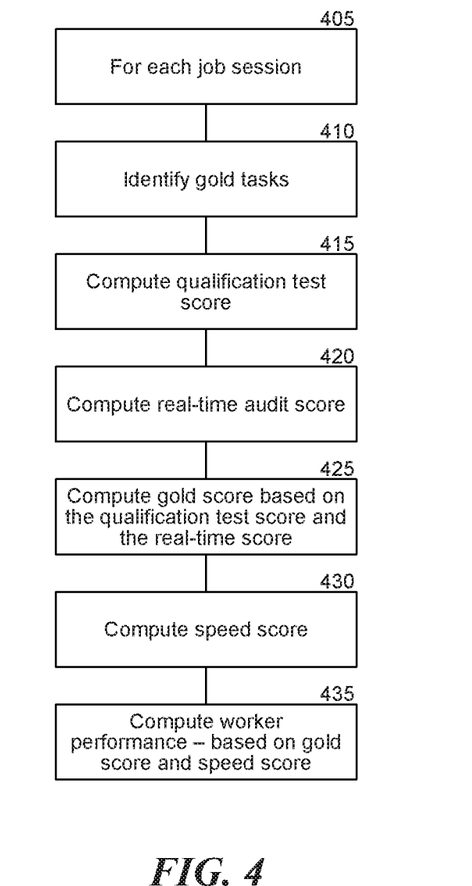
FIG. 4 is a flow diagram showing a process performed by the facility in some embodiments in order to measure worker performance.

FIG. 4 illustrates a flow diagram showing a process performed by the facility in some embodiments in order to measure a worker's quality of work/performance.

Gold Tasks/Gold Samples

In act 405, for each job, the facility identifies one or more gold tasks for a job session (act 410). Gold tasks are special tasks designed to test the quality of crowd workers' responses. The gold tasks are designed (1) to be representative of tasks in a particular domain, and (2) to have possible responses that are clearly correct, and other possible responses that are clearly incorrect. In some cases, the gold set of tasks are built by trusted and/or skilled crowd workers. In these situations, a pre-determined number of tasks is first made by a trusted/skilled crowd worker. Then, these tasks are used to obtain qualification test scores (QTSs) and perform real-time audits (RTAs) for other crowd workers, as described below.

Qualification Tests Score

In act 415, the facility builds qualification tests for each job session. The facility evaluates data related to gold samples used before the actual job session. The facility defines a passing threshold and the number of retries a crowd worker is entitled to. In some embodiments, the facility calculates qualification tests correctness ratio using formula (1) below.

$$QTScore = \frac{\text{Correct } CQTs}{QTs} \quad (1)$$

where QTs is the total number of tasks/micro-tasks (also referred to as Human Intelligent Tasks (HIT)) executions that are made in a qualification test and Correct QTs is the number of correct answers where the result matches the gold result.

Real-Time Audits Score

In act 420, the facility evaluates data related to gold samples during a job session, which may be inserted between micro-tasks, such as randomly.

In some embodiments, the facility includes RTAs as 1% to 50% of the tasks in a job session. RTAs provide information about how well a crowd worker is behaving, since the result is known à priori. When the result is incorrect, an explanation can be provided to the crowd worker to improve the crowd worker's performance in the remaining tasks. In certain cases, a threshold is defined; in some embodiments, if a crowd worker fails too many RTAs, the facility takes actions such as terminating the session.

In some embodiments, the facility calculates a correctness ratio for real-time audits using formula (2) below.

$$RTAScore = \frac{Correct\ RTAs}{RTAs} \quad (2)$$

RTAs is the total number of HIT executions that are real-time audits in a job session and Correct RTAs is the number of correct ones where the result matches the gold result.

Task Design and Preventive Measures

Depending on the task, the facility takes certain measures in terms of UI and UX to ensure a higher quality input, such as disabling copy and paste operations.

Gold Score

In act 425, the facility computes a gold score for a session. For example, the gold score is a combination of RTAScore and the QTScore defined as shown in formula (3) below:

$$\begin{cases} GoldScore_{(session)} = wQT * QTScore(session) + \\ \quad (wRTA * RTAScore(session)) \\ wQT + wRTA = 1 \end{cases} \quad (3)$$

wQT and wRTA are weights assigned to the qualifications test score and the real-time audits score, respectively.

Speed Score

In act 430, the facility computes a speed score for a job session. For example, SpeedScore is computed as shown in formula (4) below:

$$SpeedScore(session) = \min\left(1, \frac{CompletinTime(session)}{ExpectedCompletionTime(session)}\right) \quad (4)$$

Worker Performance

Upon computing the gold score and the speed score for a session, in act 435, the facility computes the worker performance as, for example, a combination of speed and quality metrics. For example, in some embodiments, the performance of a session is based on the GoldScore and the time a crowd worker took to complete a set of HITs, i.e. a crowd worker session as shown below in formula (5):

Perf(session)=((wGS*GoldScore(session))+
(wS*SpeedScore(session)))wGS+wS=1　　(5)

Worker History and Activity Logging

In addition to measuring the quality of work performed by certain workers for one or more job sessions (e.g., worker performance), the facility also tracks the pattern of behavior performed by each worker. For instance, in act 315, the facility tracks and/or logs activities performed by crowd workers. Examples of activities include, but are not limited to:
  Clicks, idle, mouse moves, etc.
  Mutual information and correlations
  Visualization of heat maps
  Speed of each task
  Speed of the whole session
  In some embodiments, the facility tracks and/or logs crowd worker actions, such as:
  Number of right and left clicks
  Key press statistics and information, which may include but are not limited to:
    Total number of keys pressed
    Count of how many times a set of particular keys were pressed (e.g. tab, backspace)
    Set of unique pressed characters
    Chronological sequence of pressed keys
    Key presses per time unit
    Keys ratio (e.g. ratio between character input and backspace)
  Mouse movements statistics and information
    Total mouse movements, considering that a mouse movement is determined by a pre-defined time threshold between mouse movements. To notice that in some embodiments, the facility normalizes this distance, i.e. not being dependent on the screen resolution
    Length traveled by mouse pointer
    Detailed coordinates information of mouse movement
    Position of each click
    Target element for each click
  Input fields
    Information about changes in input fields (e.g., total number of changes)
    Information about focus gain and loss (e.g. total number of focus gain)
    Information about accessed fields
      History of each field
      Sequence of accessed fields
  Total Scrolled distance
    In some embodiments, the facility normalizes this distance, i.e. renders it independent of screen resolution
    Number of times the scroll control was used
  Sequence of all crowd worker events which allows to replay without loss of information the entire human-machine interaction.

The facility determines the behavior of the crowd while doing the task. In some embodiments, a header associated with a task/job contains all the necessary information to uniquely identify the instrumented entity (e.g., an identifier associated with the execution of a task).

The facility can further track and log time related measures, such as:
  Total task time—time taken to do a HIT, e.g. in a web environment it is the wall time from page load to form submission.
  Active time—time that the worker is active. This measure is given by the total task time minus the idle time, where the idle time is the sum of inactivity intervals above a pre-defined threshold.
  Before Input Delay—time before any sort of input is given.
  After Input delay—time after the last input.

In some embodiments, the facility establishes a ratio between quality and speed for each crowd worker that reflects how productive a worker is. The facility may attribute a higher weight to more recent inputs. In some embodiments, the facility tracks previous scores in general and, for certain tasks, credentials (CV) and preferences. The facility can also calculate the rank of a crowd worker based on previous tasks (history). A higher rank means that a worker has more experience and its contribution was valuable. The facility also considers crowd worker areas of expertise according to their CV. In some cases, the facility considers motivation and worker preferences.

Activity Logging

In act 320, the facility builds and maintains one or more models to predict the quality of crowd workers' work. In some embodiments, the facility automatically predicts whether a worker's work will be of low quality, such as where the worker works in a careless way, or where the worker is actually a bot. In various embodiments, the facility uses a variety of supervised and unsupervised machine learning model types such as K-means models; support vector machines; models featuring outlier detection; deep learning models, such as neural networks, etc. For example, the facility utilizes one or more of the following types of models:

Prediction models:
Predict the quality of input by using previous inputs/score
Predict when a planned (not started) job will finish based on past events (before crowd applies)
Predict when a running job will finish based on the crowd that is executing the tasks and execution rate
Quality control models:
Detect low quality contributions based on the metrics defined above for crowd behavior (e.g. activity log, previous contributions)
Detect low quality contributions based on the actual input given by the crowd
Automatic suggestions to enterprise clients and crowd workers In some embodiments, the facility establishes a model where the dependent variable is the quality level of future work. In various embodiments, the model established by the facility is based on such independent variables as the quality or speed of tasks already performed in the current session; the type of tasks; quality metrics from earlier sessions; worker credentials; worker preferences; etc. In some embodiments, the model established by the facility uses independent variables including work projects selected; content of responses; the timing of user interface interactions— e.g., mouse movement speed, mouse clicking speed, typing speed, etc.; the pattern of such user interface interactions— e.g., mouse movement shape, typing cadence, etc.

In various embodiments, the facility predicts a finish time for a work session in which a particular worker will perform a particular set of tasks. In various embodiments, the facility performs this prediction (1) before work on the task set begins, or (2) after work on the task set is underway. In various embodiments, the facility uses a model based on such factors as the amount of time spent on past tasks or task sets by the same worker or workers that are similar in certain ways; task execution rate in the present task set; etc.

Real-Time Suggestions

In some embodiments, the facility provides feedback and/or automatic suggestions while doing the tasks either to motivate crowd workers, to correct crowd worker assumptions, or to call for their attention to specific details. For example, in some embodiments, the facility automatically suggests to a worker which answers, tasks or task sets to choose; how to improve their performance on tasks; etc. In some embodiments, the facility automatically suggests to a client how to configure its project, such as the number of workers to request; the credentials or performance metrics of workers to request; how to create or organize tasks; etc.

Task Reviews

In some embodiments, the facility provides for a review of the contribution of another crowd worker by a more experienced worker and accept the reviewed contribution as the correct one. Here, the facility can automatically account for the differences between an answer and its correction, independently of the type of task and type of input.

Break Inter-Annotator Disagreements with Additional Input

In some embodiments, the facility calls in a crowd worker in order to have a clear majority of a specific answer. For example, in a binary task, if two workers give different answers, then the opinion of a third worker may be requested by the facility to determine the correct answer. In case majority of an answer is not achieved, a maximum number of additional crowd workers can be defined.

Answer Consensus or Majority Vote

In some embodiments, the facility determines answer consensus or majority vote metrics for certain tasks. The consensus or majority vote metrics work well for cases where we have many workers that are doing the same task having a lower level of subjectiveness.

A job consensus reflects how many answers, given by all workers, match. The consensus metric when applied to the input given by a single worker reflects how many of his/her answers match the most select answer.

Thus, for a given crowd worker c, task t, and job j, we will have con(c, j) defined as in formula (7)-(10) below:

$$con(c, t) = \begin{cases} 0, & majority_{answer}(t) \neq given_{answer}(c) \\ 1, & majority_{answer}(t) = given_{answer}(c) \\ 0, & majority_{answer}(t) \text{ is undefined} \end{cases} \quad (7)$$

$$given_{answer}(c) = \text{answer selected by the crowd member } c \quad (8)$$

$$majority_{answer}(t) = \quad (9)$$
most select answer by crowd members contributing to $t$ $$con(c, j) = \frac{\sum con(c, t)}{|t, \text{ where } t \in j|} \quad (10)$$

Subjectiveness

In some embodiments, the facility determines subjectiveness value for tasks. The subjectiveness value can be given according to a pre-defined scale that rates how subjective the answer of a task is.

The subjectiveness of a task proportionally affects other metrics (like the majority vote) in an inverse manner. The more subjective a task is, the less relevant the opinion of other crowd workers will be.

The subjectiveness Subj of task t is given by formula (6) below:

$$Subj(t) = \text{Correct answers}(t)/\text{Total answers}(t) \quad (6)$$

If correct answers are undetermined or infinite, like in a text elicitation task, then subj(t) will be 1. In case both, correct and total answers are undetermined then subj(t) will also be 1. Typically, when the number of correct answers if determined, you can also estimate the number of total answers; however, in exceptional situations where that is not verified but there are limited correct answers, subj(t) is zero.

Consensus or majority vote metrics can be affected by how subjective a task is in a non-linear way, as a highly subjective task will not achieve consensus and a more objective task will have higher probability of achieving consensus.

In act 325, where a model operated by the facility predicts that a worker will produce work of low quality (e.g., when the quality of work is below a certain threshold value), in various embodiments, the facility flags this worker for manual review (act 330); automatically suspends the worker from performing further work (act 340); automatically suspends the worker from receiving further payment (act 340); etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

Those skilled in the art will appreciate that the process shown in FIGS. 3-4 may be altered in a variety of ways. For example, the order of the acts may be rearranged; some acts may be performed in parallel; shown acts may be omitted, or other acts may be included; a shown acts may be divided into sub acts, or multiple shown acts may be combined into a single act, etc.

We claim:

1. A method in a computing system for predicting a time of completion of a set of tasks in a micro-tasking platform, comprising:

for each first crowdsourced worker of a first set of crowdsourced workers in the micro-tasking platform:
assigning a first set of tasks to the first crowdsourced worker, wherein tasks in the first set of tasks are associated with a job session;
capturing, by the micro-tasking platform, a plurality of interactions by the first crowdsourced worker with a user interface generated by the micro-tasking platform, the plurality of interactions captured using a processor that detects timing and a pattern of the first crowdsourced worker's interactions with the user interface during the job session; and
determining, by the micro-tasking platform, an active time that represents a total amount of time of the first crowdsourced worker's interactions with the user interface during the job session;

training a model, by the micro-tasking platform, to predict an estimated time of completion of another set of tasks based on the active time determined for each first crowdsourced worker in the first set of crowdsourced workers, the model trained using the plurality of interactions by a different crowdsourced worker from the first set of crowdsourced workers as the first crowdsourced workers completed different tasks;

for each second crowdsourced worker in a set of second crowdsourced workers:
assigning a second set of tasks to the second crowdsourced worker;
capturing, by the micro-tasking platform, a plurality of interactions by the second crowdsourced worker with the user interface while the second crowdsourced worker completes a first subset of the second set of tasks, wherein the plurality of interactions by the second crowdsourced worker are captured using a processor that detects timing and a pattern of the second crowdsourced worker's interactions with the user interface during the completion of the first subset of the second set of tasks;
before the second worker completes a second subset of the second set of tasks, applying the trained model, by the micro-tasking platform, to the observed interactions by the second worker to predict an estimated time of completion, by the second worker, of the second set of tasks;
generating by the micro-tasking platform, based on the estimated time of completion of the second set of tasks, a recommendation for display to the second crowdsourced worker while the second crowdsourced worker completes a task in the second subset of the second set of tasks;
after the set of second crowdsourced workers have each completed the corresponding second set of tasks, identifying one or more of the second crowdsourced workers whose work on the corresponding second set of tasks exceeds a quality threshold; and
retraining the trained model based on the observed interactions by the one or more identified second crowdsourced workers, the estimated time of completion of the second set of tasks by the one or more identified second crowdsourced workers, and an actual time of completion of the second set of tasks by the one or more identified second crowdsourced workers.

2. The method of claim 1:
wherein the timing of the first crowdsourced worker's interactions with the user interface or the timing of the second crowdsourced worker's interactions with the user interface comprise one or more of:
mouse movement speed,
mouse clicking speed, or
typing speed; and
wherein the pattern of the first crowdsourced worker's interactions with the user interface or the pattern of the second crowdsourced worker's interactions with the user interface comprise one or more of:
mouse movement shape, or
typing cadence.

3. The method of claim 1 wherein the trained model is a statistical model.

4. The method of claim 1 wherein the trained model is a machine learning model.

5. The method of claim 1, further comprising taking action with respect to the second crowdsourced worker on the basis of the estimated time of completion of the second set of tasks by the second crowdsourced worker.

6. The method of claim 5 wherein the action taken is suspension of the second crowdsourced worker.

7. The method of claim 1, further comprising measuring a level of quality of work produced by the second crowdsourced worker on the second set of tasks, wherein measuring the level of quality of work comprises:
identifying a set of gold tasks, wherein each gold task in the set of gold tasks is associated with a gold result, and wherein the set of gold tasks comprises a set of prior gold tasks used before a job session associated with the second set of tasks and a set of present gold tasks used during the associated job session;
computing a qualification tests score based on the set of prior gold tasks, wherein the qualification tests score is a function of a size of the set of prior gold tasks and a total number of correct answers whose result match a corresponding gold result of gold tasks in the set of prior gold tasks;
computing a real-time audits score based on the set of present gold tasks, wherein the real-time audit score is a function of a size of the set of present gold tasks and a total number of correct answers whose result match a corresponding gold result of gold tasks in the set of present gold tasks; and
computing a gold score based on the computed qualification tests score and the computed real-time audits score.

8. The method of claim 7, wherein measuring flail the level of quality of work produced by the second crowdsourced worker on the second set of tasks further comprises:
computing a speed score for the job session based on an actual completion time of the job session and the estimated time of completion of the second set of tasks.

9. The method of claim 8, wherein measuring (fall the level of quality of work produced by the second crowdsourced worker on the second set of tasks further comprises:
computing a worker performance score based on the computed gold score and the computed speed score.

10. The method of claim 9, wherein computing the worker performance score further comprises:
assigning a first weight to the computed gold score; and
assigning a second weight to the computed speed score.

11. The method of claim 7, wherein computing the gold score further comprises:
assigning a first weight to the computed qualification tests score; and
assigning a second weight to the computed real-time audits score.

12. The method of claim 1, further comprising:
for each crowdsourced worker of the first set of crowdsourced workers in the micro-tasking platform:
computing a rank of the crowdsourced worker based on the observed interactions by the crowdsourced worker with the micro-tasking platform, wherein the rank is a function of at least one of an area of expertise of the crowdsourced worker, a motivation of the crowdsourced worker, or one or more preferences of the crowdsourced worker.

13. The method of claim 1, wherein the plurality of interactions by the first crowdsourced work with the user interface comprises one or more of:
number of right clicks, or
number of left clicks, or
key press information, or
mouse movement information, or
changes in input fields, or
focus gain of input fields, or
focus loss of input fields, or
input fields accessed information, or
scrolling information, or
sequence of all events performed by the crowdsourced worker, or
total task time, or
active time that indicates a time that the crowdsourced worker is active, or
time lapse before any input is given by the crowdsourced worker, or
time lapse after a last input given by the crowdsourced worker,
or any combination thereof.

14. The method of claim 1, wherein the plurality of interactions by the first crowdsourced worker with the user interface generated by the micro-tasking platform are assigned a weight factor based on timestamps of the interactions.

15. The method of claim 1, wherein the recommendation comprises one or more suggestions related to:
choosing answers, or
choosing tasks, or
configuring project information,
or any combination thereof.

16. The method of claim 1, further comprising:
computing majority vote metrics for a subset of the first set of tasks, wherein the majority vote metrics reflect a number of matching answers given by each crowdsourced worker of the first set of crowdsourced workers.

17. The method of claim 1, further comprising:
computing subjectiveness values for a subset of the first set of tasks, wherein the subjectiveness value of a distinguished task rates a level of subjectiveness of an answer of the distinguished task.

18. A computer-readable storage medium whose contents are capable of causing a computing system to perform a method for predicting a level of quality of work of crowdsourced workers of a micro-tasking platform, the method comprising:
for each first crowdsourced worker of a first set of crowdsourced workers in the micro-tasking platform:
assigning a first set of tasks to the first crowdsourced worker, wherein tasks in the first set of tasks are associated with a job session;
capturing, by the micro-tasking platform, a plurality of interactions by the first crowdsourced worker with a user interface generated by the micro-tasking platform, the plurality of interactions captured using a processor that detects timing and a pattern of the first crowdsourced worker's interactions with the user interface during the job session; and
determining, by the micro-tasking platform, an active time that represents a total amount of time of the first crowdsourced worker's interactions with the user interface during the job session;
training a model, by the micro-tasking platform, to predict an estimated time of completion of another set of tasks based on the active time determined for each first crowdsourced worker in the first set of crowdsourced workers, the model trained using the plurality of interactions by a different crowdsourced worker from the first set of crowdsourced workers as the first crowdsourced workers completed different tasks;
for each second crowdsourced worker in a set of second crowdsourced workers:
assigning a second set of tasks to the second crowdsourced worker;
capturing, by the micro-tasking platform, a plurality of interactions by the second crowdsourced worker with the user interface while the second crowdsourced worker completes a first subset of the second set of tasks, wherein the plurality of interactions by the second crowdsourced worker are captured using a processor that detects timing and a pattern of the second crowdsourced worker's interactions with the user interface during the completion of the first subset of the second set of tasks;
before the second worker completes a second subset of the second set of tasks, applying the trained model, by the micro-tasking platform, to the observed interactions by the second worker to predict an estimated time of completion, by the second worker, of the second set of tasks;
generating by the micro-tasking platform, based on the estimated time of completion of the second set of tasks, a recommendation for display to the second crowdsourced worker while the second crowdsourced worker completes a task in the second subset of the second set of tasks;
after the set of second crowdsourced workers have each completed the corresponding second set of tasks, identifying one or more of the second crowdsourced workers whose work on the corresponding second set of tasks exceeds a quality threshold; and
retraining the trained model based on the observed interactions by the one or more identified second crowdsourced workers, the estimated time of completion of the second set of tasks by the one or more identified second crowdsourced workers, and an actual time of completion of the second set of tasks by the one or more identified second crowdsourced workers.

19. The computer-readable storage medium of claim 18, wherein the method further comprises taking action with respect to the first worker on the basis of the predicted level of quality of work that will be produced by the first worker.

\* \* \* \* \*